United States Patent Office 2,842,565
Patented July 8, 1958

2,842,565

CYCLOPENTANOPHENANTHRENE DERIVATIVES AND METHOD FOR THE PRODUCTION THEREOF

Franz Sondheimer, Octavio Mancera, and George Rosenkranz, Mexico City, Mexico, assignors to Syntex S. A., Mexico City, Mexico, a corporation of Mexico No Drawing. Application May 12, 1955
Serial No. 507,978

Claims priority, application Mexico June 5, 1954

7 Claims. (Cl. 260—397.3)

The present invention relates to novel cyclopentanophenanthrene derivatives and to a process for the production thereof.

More particularly, the present invention relates to a novel process for the production of the known androgenic hormone, $\Delta^4$-androsten-17$\alpha$-ol-3-one, the 17-stereoisomer of testosterone. This compound which is also known as isotestosterone and epitestosterone is ordinarily formed in very small amounts as a secondary product in some of the commercial processes for the manufacture of testosterone, where it occurs together with the predominant $\beta$ isomer. $\Delta^4$-androsten-17$\alpha$-ol-3-one is known to be an active androgenic hormone, although its activity with regard to androgenic effects is somewhat less than that of testosterone. The compound, however, has valuable anabolic and/or other properties which characterize the androgenic hormones.

In accordance with the present invention, there has been provided a novel method and novel intermediates for the preparation of $\Delta^4$-androsten-17$\alpha$-ol-3-one from the known compound 3$\beta$-hydroxy-$\Delta^{5,16}$-etiocholadienic acid previously described by Marker and Wagner (J. A. C. S. 64, 1842, 1942), as well as by Ruzicka and Kauter (Helv. Chim. Acta 27, 1164, 1944).

The process of the present invention and the production of the novel intermediates $\Delta^{5,16}$-androstadien-3$\beta$-ol and the 16,17-epoxide of $\Delta^4$-androsten-3-one are exemplified by the following equation:

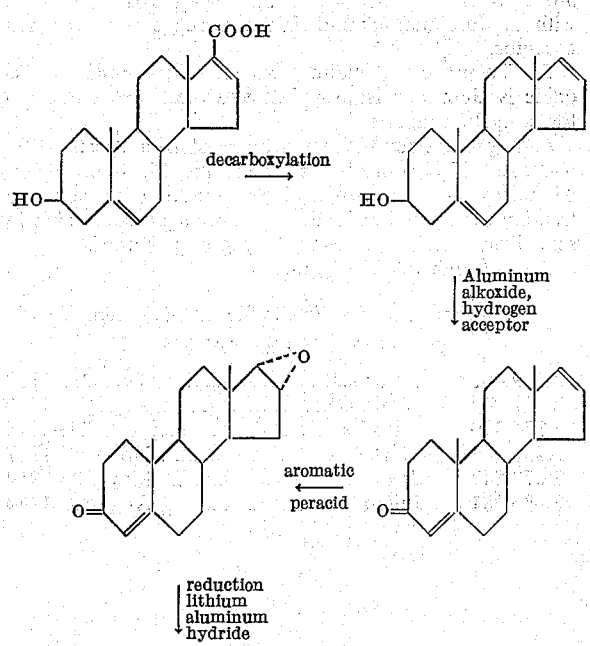

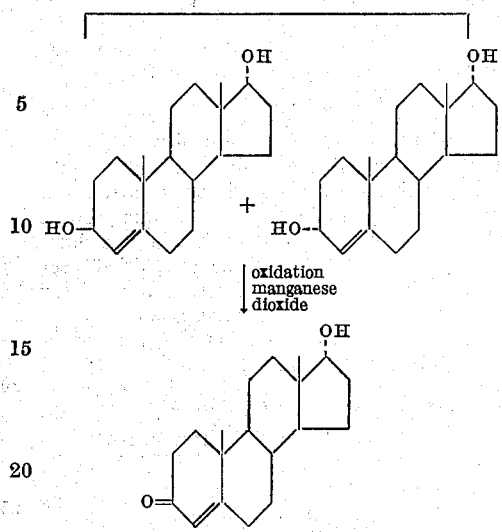

In practicing the process above outlined in the first step, 3$\beta$-hydroxy-$\Delta^{5,16}$-etiocholadienic acid is decarboxylated as by refluxing with quinoline preferably in the presence of copper chromite. For this step of the reaction the 3$\beta$-hydroxy-$\Delta^{5,16}$-etiocholadienic acid is dissolved in the quinoline and mixed with a small quantity of copper chromite. The mixture is then refluxed for a substantial period of time, i. e. of the order of four hours, cooled and poured into water. The product is then extracted with an organic solvent such as ether and purified to produce $\Delta^{5,16}$-androstadien-3$\beta$-ol.

For the second step of the process above-outlined the $\Delta^{5,16}$-androstadien-3$\beta$-ol is subjected to Oppenhauer oxidation. This involves the use of an inert solvent, such as toluene, a hydrogen acceptor, preferably a ketone hydrogen acceptor such as cyclohexanone and an aluminum alkoxide, as for example aluminum isopropylate. The starting compound is dissolved in the toluene and cyclohexanone and the mixture is preferably distilled for a short period of time in order to remove traces of moisture. Thereafter, the aluminum isopropylate dissolved in toluene is added and the mixture refluxed for a period of time of the order of one hour. The reaction mixture is then poured into water and purified as by steam distillation. After further purification, there was obtained $\Delta^{4,16}$-androstadien-3-one, a known compound characterized by a strong, urine-like smell.

The $\Delta^{4,16}$-androstadien-3-one is then subjected to selective formation of the corresponding 16,17-epoxide. A suitable oxidizing agent for this purpose is an aromatic peracid, as for example perbenzoic acid, or monoperphthalic acid. For the oxidation the $\Delta^{4,16}$-androstadien-3-one is dissolved in a suitable organic solvent such as chloroform and mixed with a solution, as for example an ether solution of perbenzoic acid. The mixture is then kept standing at a temperature of about room temperature for approximately one day. After suitable purification, the 16,17-epoxide of $\Delta^4$-androsten-3-one is obtained.

The epoxide obtained in accordance with the previous step just referred to is then reduced with lithium aluminum hydride, preferably in solution in a suitable organic solvent such as anhydrous tetrahydrofurane. The resultant product after suitable purification is a mixture of isomeric $\Delta^4$-androstene diols having the 17$\alpha$-hydroxy group and the 3$\beta$ and 3$\alpha$-hydroxy group respectively. The mixture of isomeric compounds is then subjected to selective oxidation of the 3-hydroxyl group by treatment at room temperature with manganese dioxide utilizing the conditions more particularly set forth in United States application of Sondheimer, Romo, Rosenkranz and Djerassi, Serial Number 344,246, filed March 23, 1953. After purification the resultant compound is the desired isotestosterone.

The following specific examples serve to illustrate but are not intended to limit the present invention:

*Example I*

1 g. of crude $3\beta$-hydroxy-$\Delta^{5,16}$-etiocholadienic acid was dissolved in 10 cc. of distilled quinoline and mixed with 100 mg. of copper chromite. The mixture was refluxed for four hours, cooled, poured into water and the product was extracted with ether, washed with dilute sodium carbonate solution and water until neutral, dried over sodium sulfate and evaporated to dryness, thus giving 0.8 g. of an oil which was chromatographed in a column with 50 g. of washed alumina. The fractions eluted from the column with mixtures of benzene and ether afforded 0.55 g. of crystalline $\Delta^{5,16}$-androstadien-$3\beta$-ol having a melting point of 133°–137° C. The analytical sample was obtained by recrystallization from acetone-hexane and had a melting point of 140°–141° C., $[\alpha]_D$ −66° (chloroform).

*Example II*

10 g. of $\Delta^{5,16}$-androstadien-$3\beta$-ol was dissolved in 475 cc. of toluene and 75 cc. of cyclohexanone and 50 cc. of the mixture was distilled in order to remove traces of moisture. 5 g. of aluminum isopropylate dissolved in 50 cc. of anhydrous toluene was then added and the mixture was refluxed for one hour under anhydrous conditions. After pouring into water, the mixture was steam distilled and cooled and the precipitate formed was filtered, dried on the funnel and dissolved in chloroform. Some insoluble matter was removed by filtration and the solution was evaporated nearly to dryness and crystallized by the addition of hexane. There was obtained 8 g. of $\Delta^{4,16}$-androstadien-3-one with a melting point of 130°–133° C., a substance which is characterized by its strong urine-like smell. The analytical sample, prepared by two further recrystallizations from chloroform-hexane, had a melting point of 132°–134° C. On direct comparison, this substance proved to be identical to a sample prepared in accordance with the method described by Prelog, Ruzicka, Meister and Wieland Helv. Chim. Acta 28, 618, 1945.

*Example III*

3 g. of $\Delta^{4,16}$-androstadien-3-one was dissolved in 5 cc. of chloroform and mixed with 33.5 cc. of an ether solution of perbenzoic acid containing 0.042 g. of peracid per cc. and the mixture was kept standing at room temperature for sixteen hours. More chloroform was added and the solution was washed with dilute sodium carbonate solution and water until neutral, dried over sodium sulfate and evaporated to dryness. The odorless residue was chromatographed in a column with 150 g. of washed alumina. The fractions eluted from the column with hexane-benzene (20–80) and with benzene were recrystallized from chloroform-hexane, thus yielding 2.1 g. of crystals of the 16.17-epoxide of $\Delta^4$-androsten-3-one with a melting point of 208°–211° C.

*Example IV*

A solution of 3 g. of the epoxide obtained in accordance with Example III in 130 cc. of anhydrous tetrahydrofurane was added to a suspension of 3 g. of lithium aluminum hydride in 30 cc. of anhydrous tetrahydrofurane. The mixture was refluxed for two hours under anhydrous conditions, cooled and the excess of hydride was destroyed by the cautious addition of water. Chloroform was added, followed by saturated sodium sulfate solution and some anhydrous sodium sulfate and the precipitate of inorganic salts was filtered and washed with chloroform. The organic solution was evaporated to dryness and the precipitate (mixture of isomeric $\Delta^4$-androstenediols) was dissolved in 300 cc. of chloroform, mixed with 15 g. of manganese dioxide and the mixture was shaken for 14 hours. 6 additional grams of manganese dioxide was added and the stirring was continued for a further 22 hours. The solution was filtered, evaporated to dryness and the residue was chromatographed in a column of aluminum oxide, thus giving 1.76 g. of isotestosterone with a melting point of 213°–216° C. The substance had an $[\alpha]_D$+69° (ethanol), +86° (chloroform), and an ultraviolet absorption maximum $\lambda$ max. 240 m$\mu$ (log $\epsilon$4.2). The melting point in mixture with an authentic sample of isotestosterone suffered no depression.

A mixture of 100 mg. of isotestosterone, 2 cc. of anhydrous pyridine and 2 cc. of acetic anhydride was heated on the steam bath for one hour and poured into water. The precipitate was collected, washed to neutral and crystallized from acetone hexane, thus giving 100 mg. of the acetate of isotestosterone, with a melting point of 113°–115° C.

We claim:

1. A process for the production of $\Delta^4$-androsten-17$\alpha$-ol-3-one which comprises decarboxylating $3\beta$-hydroxy-$\Delta^{5,16}$-etiocholadienic acid to form $\Delta^{5,16}$-androstadien-$3\beta$-ol, treating $\Delta^{5,16}$-androstadien-$3\beta$-ol with an aluminum alkoxide in the presence of a hydrogen acceptor to form $\Delta^{4,16}$-androstadien-3-one, oxidizing the last mentioned compound with an aromatic peracid to form the corresponding 16,17-epoxide, reducing the 3-keto group and the epoxide with lithium aluminum hydride to form a mixture of $\Delta^4$-androsten-3$\alpha$,17$\alpha$-diol and $\Delta^4$-androsten-3$\beta$,17$\alpha$-diol and selectively oxidizing the 3-hydroxy group of the mixture with manganese dioxide.

2. A process for the production of $\Delta^{5,16}$-androstadien-$3\beta$-ol which comprises refluxing $3\beta$-hydroxy-$\Delta^{5,16}$-etiocholadienic acid with quinoline.

3. A process for the production of $\Delta^{5,16}$-androstadien-$3\beta$-ol which comprises refluxing $3\beta$-hydroxy-$5,16$-etiocholadienic acid with quinoline in the presence of copper chromite.

4. A process for the preparation of $\Delta^{4,16}$-androstadien-3-one which comprises oxidizing $\Delta^{5,16}$-androstadien-3-one with an aluminum alkoxide in the presence of a hydrogen acceptor.

5. The process of claim 4 wherein the aluminum alkoxide is aluminum isopropylate and the hydrogen acceptor is cyclohexanone.

6. A process for the preparation of $\Delta^4$-androsten-17$\alpha$-ol-3-one which comprises reducing the 16,17-epoxide of $\Delta^4$-androsten-3-one with lithium aluminum hydride and treating the reduction product with manganese dioxide to selectively oxidize the 3-hydroxy group thereof.

7. $\Delta^{5,16}$-androstadien-$3\beta$-ol.

References Cited in the file of this patent

UNITED STATES PATENTS

| | | |
|---|---|---|
| 2,109,400 | Miescher | Feb. 23, 1938 |
| 2,212,014 | Schwenk | Aug. 20, 1940 |
| 2,374,370 | Miescher | Apr. 24, 1945 |
| 2,430,988 | Marker | Nov. 18, 1947 |
| 2,673,847 | Spero | May 30, 1954 |
| 2,686,181 | Julian | Aug. 10, 1954 |